United States Patent
Monaghan et al.

(10) Patent No.: US 10,614,432 B2
(45) Date of Patent: Apr. 7, 2020

(54) CHANNEL INTEGRATION PROCESSING

(71) Applicants: Andrew David Monaghan, Dundee (GB); Mervin Amos, London (GB); Jeffrey Stephen Cooper, Kitchener (CA); Andrew Short, Kitchener (CA)

(72) Inventors: Andrew David Monaghan, Dundee (GB); Mervin Amos, London (GB); Jeffrey Stephen Cooper, Kitchener (CA); Andrew Short, Kitchener (CA)

(73) Assignee: NCR Corporation, Atlanta, GA (US)

(*) Notice: Subject to any disclaimer, the term of this patent is extended or adjusted under 35 U.S.C. 154(b) by 792 days.

(21) Appl. No.: 15/010,335

(22) Filed: Jan. 29, 2016

(65) Prior Publication Data

US 2017/0221023 A1  Aug. 3, 2017

(51) Int. Cl.
| | |
|---|---|
| *G06Q 20/00* | (2012.01) |
| *G06Q 20/10* | (2012.01) |
| *G06Q 20/42* | (2012.01) |
| *G06Q 20/32* | (2012.01) |
| *G06Q 20/16* | (2012.01) |
| *H04L 12/66* | (2006.01) |

(52) U.S. Cl.
CPC ......... *G06Q 20/1085* (2013.01); *G06Q 20/16* (2013.01); *G06Q 20/32* (2013.01); *G06Q 20/325* (2013.01); *G06Q 20/425* (2013.01); *H04L 12/66* (2013.01)

(58) Field of Classification Search
USPC ....................................................... 705/35, 39
See application file for complete search history.

(56) References Cited

U.S. PATENT DOCUMENTS

| | | | | |
|---|---|---|---|---|
| 5,701,487 A | * | 12/1997 | Arbouzov | G06F 8/425 717/124 |
| 6,598,078 B1 | * | 7/2003 | Ehrlich | H04L 43/00 709/224 |
| 6,603,569 B1 | * | 8/2003 | Johnson, Jr. | H04N 1/00209 358/1.15 |
| 2005/0027651 A1 | * | 2/2005 | DeVault | G06Q 10/10 705/38 |
| 2009/0055893 A1 | * | 2/2009 | Manessis | G06Q 20/04 726/2 |
| 2010/0329444 A1 | * | 12/2010 | Ashikhmin | H04B 3/32 379/406.06 |
| 2011/0004574 A1 | * | 1/2011 | Jeong | G06N 5/02 706/12 |
| 2011/0307388 A1 | * | 12/2011 | Kim | G06Q 20/12 705/67 |
| 2011/0320349 A1 | * | 12/2011 | Olsen | G06Q 20/102 705/40 |
| 2014/0025575 A1 | * | 1/2014 | Chhabra | G06Q 20/401 705/44 |
| 2014/0068472 A1 | * | 3/2014 | Guzak | G06F 3/0484 715/764 |

(Continued)

*Primary Examiner* — William E Rankins
(74) *Attorney, Agent, or Firm* — Schwegman, Lundberg & Woessner

(57) ABSTRACT

A transaction is centrally controlled over multiple communication channels as a sequence of discrete processing units some of which are distributed. In an embodiment, the transaction's processing progression can be shared of the communication channels and paused on one communication channel and resumed on a different communication channel.

20 Claims, 6 Drawing Sheets

(56) References Cited

U.S. PATENT DOCUMENTS

2016/0063404 A1* 3/2016 Doerr ................ G06Q 10/0633
705/7.27
2016/0071233 A1* 3/2016 Macko ................ G06F 16/9024
345/440
2016/0300018 A1* 10/2016 Kieckens ............... G16H 10/60

* cited by examiner

CHANNEL INTEGRATION PROCESSING

BACKGROUND

Technology and automation has been aggressively adopted nearly by everyone. Nowhere is this more prevalent than the use of mobile devices that include phones, tablets, and wearable devices. Business are very cognizant of this technology transformation and are providing technology to customers on a variety of diverse technology platforms to be highly available and accessible to customers 365 days a year and 25 hours a day regardless of the types of devices used by the customers.

However, being highly-available and ever-present requires a lot of software systems and hardware devices, which business must maintain and support, and which adds to business expense and support staff/contractors.

Moreover, when a customer begins interacting with a business system through one type of device, and then migrates to a different type of device, the business systems do not provide integration in any significant manner, which means an interaction that was initiated through one device usually most be restarted when the customer migrates to the different type of device. This is inconvenient and frustrating to the consumer and may result in a lost customer of the business or decreased loyalty for the customer to the business.

One issue that prevents any real advancement in the above-mentioned technology area is that a business may have different policies that are evaluated when one type of device is used versus when a different type of device is used by the customer.

Another issue is scale of effort that a business would entail by uniformly integrating customer interactions across a plethora of existing technology platforms and systems. Such an effort would require replacing each system or substantially rewriting all or a significant part of the source code associated with the existing systems.

SUMMARY

In various embodiments, methods and a transaction processing server for channel integration processing are presented.

According to an embodiment, a method for channel integration processing is provided. Specifically, in an embodiment, a transaction request for a transaction is received from a first communication channel. A processing list is obtained for the transaction. Processing of the transaction is controlled over at least one second communication channel by processing the processing list.

DETAILED DESCRIPTION

Figure 1:
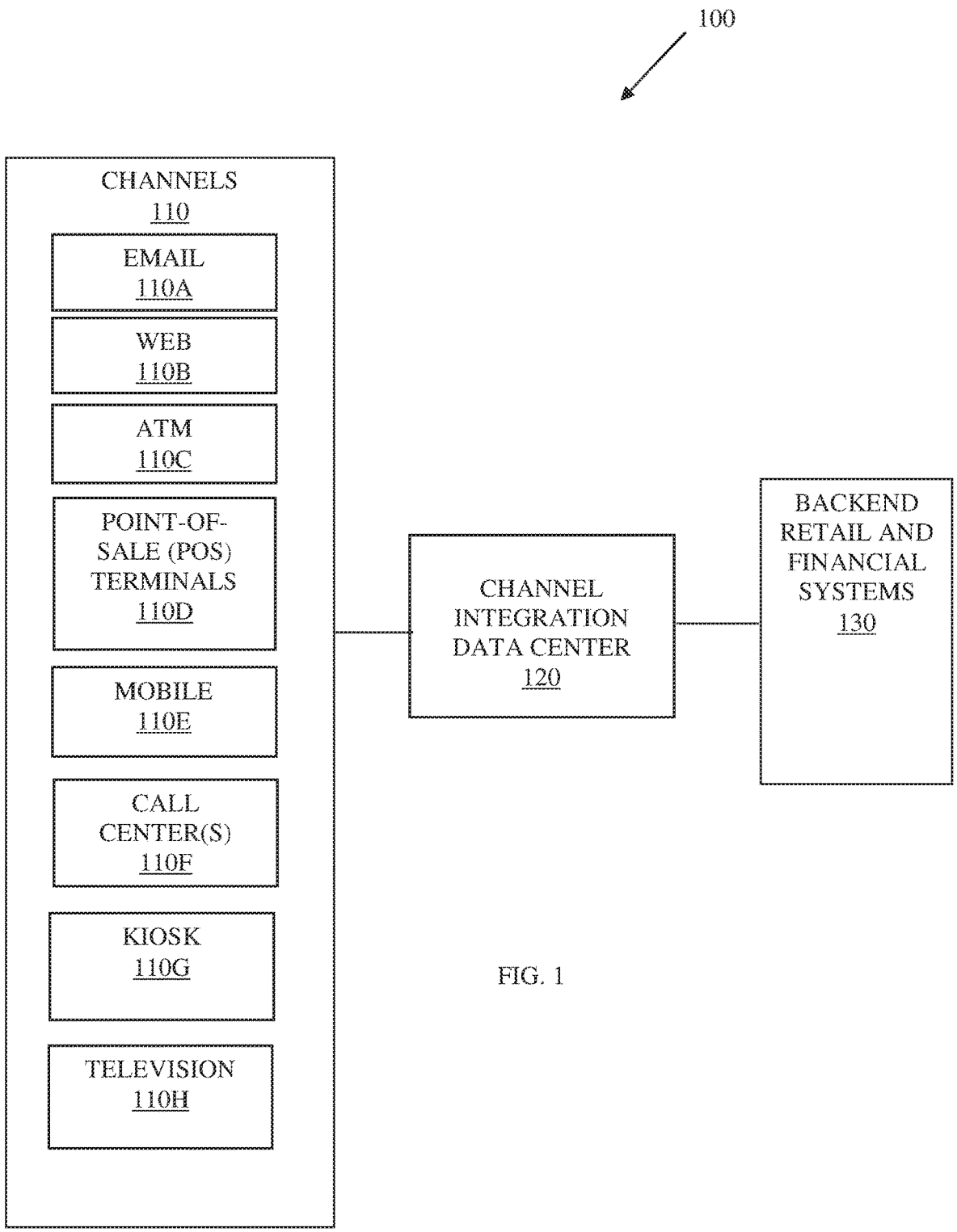
FIG. 1 is a diagram of an example system for channel integration processing, according to an example embodiment.

FIG. 1 is a diagram of an example system for channel integration processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the channel integration processing presented herein and below.

The techniques, methods, and SST presented herein and below for channel integration processing can be implemented in whole or in part in one, all, or some combination of the components shown in different hardware computing devices. The techniques are programmed as executable instructions in memory and/or non-transitory computer-readable storage media and processed on one or more processors associated with the hardware computing devices.

The system includes electronic communication channels 110, a channel integration data center 120, and multiple backend retail and financial technology systems 130.

The channels 110 illustrate electronic communication types that can be associated with one or more different communication devices accessible to an operator (user, customer, consumer, clerk, teller, etc.).

In the embodiment, illustrated in the FIG. 1, the channels 110 include: an email channel 110A, a web channel 110B, an Automated Teller Machine (ATM) channel 110O, a Point-Of-Sale (POS) terminal channel 110D, a mobile channel 110E (including text messaging, application based, web based channels), a call center channel 110F, a kiosk channel 110G, and a television channel 110H.

The channel integration data center 120 provides processing for exposing a channel-specific interface on a device of an operator based on the channel 110 being used by that operator on the device. In an embodiment.

The backend retail and financial systems 130 are existing legacy-based interaction and transaction based systems from a plethora of industries.

During operation of the system 100, an operator uses any device and initiates an interaction or transaction with a particular backend retail and/or financial system 130. This initial interaction/transaction is routed over a network connection (wired or wireless) to the channel integration data center 120.

In response, a device and channel-specific interface is exposed on the device of the operator for continuing the interaction with the backend retail and/or financial system 130. The channel-specific interface is exposed to the operator's device by the channel integration data center 120. In an embodiment, the channel-specific interface is exposed as one or more cooperating web-pages processed within a browser application that executes on the operator's device. It may also be that the channel-specific interface is a native application for the channel on which it is being provided (such that each channel may have a channel-specific interface).

The channel-specific interface permits the channel integration data center 120 to control and normalize information inputted by the operator into the interface based on a channel 110 being accessed.

The channel integration data center 120 then tokenizes or identifies different actions 261B needed by channel integration data center 120 for processing a transaction or interaction identified from the information inputted by the operator into the interface. In an embodiment, part of the tokenization includes identifying a series of actions 261B that channel integration data center 120 is to process with the backend retail and financial system 130 (more detail on actions 261B is provided below with the description of the FIG. 2). Identification can be predefined based on channel specific and backed system specific policies maintained by the channel integration data center 120.

The transaction/interaction is also persisted in non-volatile storage by the channel integration data center 120 in the normalized (tokenized or field-based) format, which is a format that is backend-system and channel 110 independent (although it may have channel-specific content).

The channel integration data center 120 uses the actions 261B identified and the input supplied through the channel-specific interface to initiate a network-based communication session with the backend system 130. When this is done, the normalized input is translated into a backend-specific data format and protocol that is recognized and capable of being processed by the backend system 130.

The sequence of the session with the backend system 130 is defined and available to the channel integration data center 120 in the actions 261B. Responses from the backend system 130 are processed according to policy from interacting with the backend system 130 by the channel integration data center 120 during the session. Some response may entail translating the backend system-specific data format responses into a normalized format for delivery to the interface and for additional information that the operator is to supply through the interface.

In an embodiment, a transaction initiated by the operator through a first channel 110A-H can be paused through the interface exposed on the operator device by: 1) manually by the operator selecting/activating a pause or temporarily suspension option within the interface, 2) automatically based on a non-response of the operator within the interface after a predefined period of elapsed time of inactivity by the operator and assuming policy evaluation permits transaction pausing, or 3) detecting the reaching of a significant predefined processing point in the transaction processing. At some later point in time (again assuming policy evaluation permits the length of the later point in time based on a time of suspension and current time), the operator or a different operator (such as a clerk assisting the original operator who is a customer) can reactivate the suspended transaction from an entirely different channel 110A-H from that which was associated with the first channel 110A-H. Because the paused transaction is normalized and persisted by the channel integration data center 120, the channel integration data center 120 can recall the paused transaction and acquire new channel-specific policy for the current channel 110 in use by the operator (or different operator). The new channel-specific policy is evaluated by the channel integration data center 120 and the transaction proceeds in the manners discussed above with the channel integration data center 120 acting as a proxy between the operator's device and the backend system 130 over the new channel 130. Thus, a transaction can begin on one channel 110A-H be suspended and resume for completion on an entirely different channel 110A-H.

Some of the above-noted aspects of the invention and other aspects are now presented and discussed with reference to the FIGS. 2-6.

Figure 2:
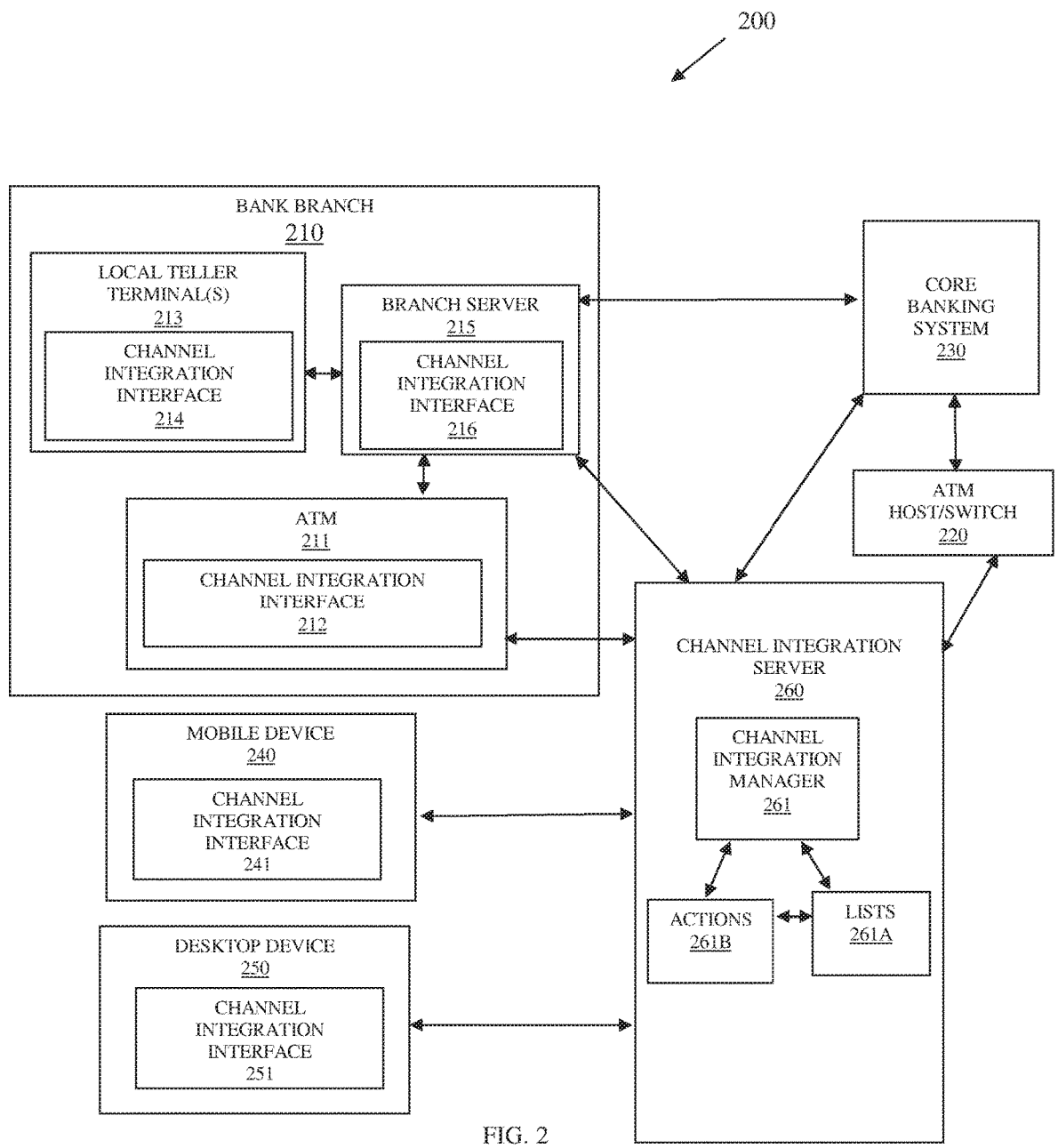
FIG. 2 is a diagram of channel integration processing system for financial institution, according to an example embodiment.

FIG. 2 is a diagram of channel integration processing system 200 for financial institution, according to an example embodiment. The system 200 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the channel integration processing presented herein and below.

The system 200 includes a bank branch 210, an ATM host/switch 220, a core banking system 230, a mobile device 240, a desktop device 250, and a channel integration server 260. The bank branch 210 includes an ATM 211 (having a channel integration interface 212), one more teller terminals 213 (each having an instance of a channel integration interface 214), and a branch server 215 (having a channel integration interface 216). The mobile device 240 includes a channel integration interface 241 and the desktop device 250 includes a channel integration interface 251.

Conventionally, a conventional ATM connects to the ATM host/switch 220 for performing a financial transaction. This conventional approach is modified and enhanced, such that the financial transaction mode is intercepted by the channel integration server 260 and handled through the channel integration manager 261. In some situations, the ATM may also separately connect to the branch server so that if that ATM supports teller assistance, the teller terminal can communicate (outside the financial transaction pathway) with the ATM through the branch server.

This can be achieved by injecting the channel integration server 260 as a proxy (transparent to the ATM 211) where financial transactions are intercepted by the channel integration server 260 (can be handled by changing a routing table in a network router to point to the channel integration server 260 instead of the ATM host/switch 220). This can also be achieved through a more-tightly controlled coupling of the channel integration interface 212 within the ATM 211 to be part of the existing ATM application (enhanced ATM application) that drives financial transactions on the ATM 211. It is noted that there may be other mechanisms for exposing the financial transaction of the ATM 211 before the transaction is forwarded to the ATM host/switch 220, any such mechanism can be deployed herein.

The processing of the system 200 will be discussed within the context of transaction scenarios occurring on the ATM 212, the teller terminals 213, the branch server 216, the mobile device 240, and/or the desktop device 250.

Initially, the channel integration manager 261 is pre-configured with institution-specific business processing logic in a predefined normalized format (normalized such that different business logic for different businesses are represented in the normalized format in a consistent syntactical and semantical format that spans the different businesses). For example, the business logic can be defined as a sequence of actions 261B to process by the channel integration manager 261 in a list 261A, a policy construct, and/or a schema.

The list 261A includes a sequence of actions 261B and each action 261B representing a unit of processing for a given transaction being processed over a given channel (such as any channel 110A-H of the FIG. 1). By breaking down a given transaction into a transaction type and channel type the channel integration manager 261 can select a list 261A having an orchestrated sequence of, which can permit (through the channel integration manager 261) a transaction being processed by a customer operating the ATM 211 to be shared with a teller operating one the teller terminals 213. This means that channel unification is achieved for transaction processing across different and disparate channels.

The selected list 261A may also provide syntax and semantics for branch processing based on detected transaction criteria that includes channel type (any of the enumerated channels 110A-H of the FIG. 1) and permits the channel integration manager 261 to inject unique processing for each different channel type.

Some sample type of actions 261B (processing units) include, by way of example only:
- actions 261B that can call a web service (or similar Service-Oriented Architecture (SOA) technology to validate an elements of a transaction;
- actions 261B that can call an external system to process a transaction;
- actions 261B that transform data in a transaction from one-format to another; and
- actions 261B that validate an element of data in a transaction (for example a cash withdraw limit).

The actions 261B defined in the list 261A may include processing units that allow a transaction to be stored and then restored from storage (such as a database maintained on or accessible to the channel integration manager 261. Storage of an uncompleted (pending) transaction for subsequent processing is referred to herein as "transaction persistence." So, and as one example, an mobile device 240 initiated transaction (initiated through the channel integration interface 241) can be paused or staged and transferred between channels, such as from a mobile channel to an ATM channel or teller channel (utilizing ATM 211 and channel integration interface 212 or utilizing teller terminal 213 and channel integration interface 214). This is orchestrated through the channel integration manager 261 and the channel integration interfaces (212, 214, 216, 241, and/or 251). This is an improvement over traditional transaction processing where uncommitted or pending transactions have to be restarted when transferred between channels.

The channel integration manager 261 processes transactions consistently across disparate channels. Each channel has its own associated limitations that are predefined and enforced by the channel integration manager 261 but consistently progresses and through the actions 261B across all channels through the channel integration manager 261.

A transaction can be paused on one channel and restored along its progression to a different channel as previously stated. This can be done based on a manual request activated within any of the interfaces (212, 214, 216, 241, and/or 251) processed by the channel integration manager 261. Moreover, this can occur to bypass channel-specific limitations (such as cash withdraw limits at the ATM 212). Furthermore, this can occur to pass the transaction to a specialists, such as a teller operating teller terminal 214. Additionally, this can occur based on a policy evaluation for the financial institution (inactivity by the customer where input is needed from the customer to proceed).

The channel integration manager 261 provides a transaction processing environment that allows business logic processing to be defined as a list 261A, schema, or structure of orchestrated actions 261B (processing units). The lists 261A define the sequence of actions 261B that are to be processed (by the channel integration manager 261, by any of the devices (211, 213, 215, 240, and/or 250, by the ATM host/switch 220, and/or by the core banking system 230). Thus, the actions 261B may also define and perform processing to:
- allow the list 261A and actions 261B of the list 261A to be shared across channels;
- allow specialization of business logic for a channel utilizing a channel-specific (channel-type) action 261B that allows a list 261A to branch, for example:
  - to limit a cash withdrawal on an ATM channel to be $300; and
  - to allow a cash withdrawal from a teller channel to be unlimited;
- provide specific actions 261B that allow a transaction to be persisted to a database and then subsequently restored via another list 261A (allowing a transaction to be stored on one channel and restored on another); and
- provide a configurable toolbox of actions 261B that are the "units of processing" of a transaction that can be orchestrated by a list 261A.

Any given transaction is processed on one channel after collecting all necessary information required to process the transaction as orchestrated by the channel integration manager 261 (the channel integration interface 212, 214, 216, 241, and/or 251 makes a transaction request to the channel integration manager 261 (such as through a message or web service call).

The channel integration manager 261 receives the transaction request and obtains the corresponding list 261A of actions 261B for that transaction. In an embodiment, the channel integration manager 261 can obtain the list 261A through content-based routing by inspecting the transaction defined in the transaction request and its associated metadata, which can include:
- the type of the transaction;
- the channel that initiated the transaction; and
- other data associated with the transaction.

Once the correct predefined list 261A of actions 261B is identified by the content-based routing performed by the channel integration manager 261, the channel integration manager 261 then processes each of the actions 261B from the list 261A in a sequential order (with branching permitted as discussed above).

The lists 261A are configurations that drive the processing performed by the channel integration manager 261 through the actions 261B. The lists 261A may also define syntax and semantics for passing parameters to the actions 261B processed serially from the lists 261A. Moreover, the lists 261A can define branch processing based on completion or status codes returned by the actions 261B processed. Each list 261A can have its own configuration (unique actions 261B, unique parameterizations, unique sequence of actions 261B, unique return codes; etc.).

In an embodiment, the actions 261B are implements as small blocks of JAVA™ code. Some example types of actions 261B include:
- actions 261B that can call a web service (or similar SOA) technology to validate elements of a transaction;
- actions 261B that can call an external system (such as core banking system 230) to transfer the processing of a transaction or a portion of the transaction;
- actions 261B that transform data in a transaction from one-format to another; such as to identifying processing recognized by an existing and legacy backend banking system 230; and
- actions 261B that validate an element of data in a transaction (for example a withdrawal limit).

The channel integration manager 261 persists a transaction as previously discussed, this persistence includes maintaining transaction data; metadata, and enrichment data provided by the channel integration manager 261. The enrichment data can include channel details where the transaction was shared and portions of the transaction processing was offloaded to external devices and systems and other types of enrichment data uniquely available to the channel integration manager 261 based on orchestrating the Omni-channel transaction processing. actions 261B can return a variety of information, such as:
  a code indicating success or failure; and
  an enumeration (for example channel-type) that can be used to branch the list 261A.

Moreover, a transaction can be restored by the channel integration manager 261 for a same channel that initiated the transaction. Alternatively, the channel integration manager 261 can restore a persisted transaction over a same channel that initiated the transaction but to a different device using a same channel. Also, as stated above, the channel integration manager 261 can restore a transaction from an initiated channel to a disparate channel that is different from the initiating channel. The transaction, as its processing progresses, can also be shared across channels (same channel types or different channel types); providing unique timely teller assistance or specialist assistance to a customer that initiated the transaction. Further, the channel integration manager 261 can offload processing a portion of the transaction processing to different channels and/or different computing devices (as discussed above).

In addition, the lists 261A that drive the processing of the channel integration manager 261 can identify actions 261B relevant to security enforcement when saving, sharing, and/or restoring a transaction.

A list 261A can also include identifiers to other lists 261A. As such, an example list 261A for persisting a transaction may be defined as follows:
  action 1—branch based upon channel:
    1.1—online—validate the user is authenticated;
    1.2—ATM—validate the user's pin block;
  action 2—validate account is valid; and
  action 3—persist the transaction to the transaction processing database.
  Action 1—Validate the referenced Transaction exists
  Action 2—Branch based upon Channel
  2.1—Online—Validate the user is authenticated
  2.2—ATM—Validate the users pin block
An example list 261A for restoring a transaction may appear as follows:
  action 1—validate the referenced transaction exists;
  Action 2—branch based upon channel;
    2.1—online—validate the user is authenticated; and
    2.2—ATM—validate the users pin block.

In addition, information that a user of the ATM 211 may normally provide in a secure manner at the ATM 211, such as the encrypted PIN code can be validated in conventional manners as what is done with a conventional ATM application, the ATM host/switch 220, and core banking system 230. In this case, the encrypted PINpad of the ATM 211 captures the PIN code and encrypts within the encrypted PINpad, the encrypted PIN code is forwarded up to the channel integration interface 212 from the encrypted PINpad and forwarded along with other necessary information (customer account, banking institution identifier, transaction type, and any withdraw or deposit amount) to the channel integration manager 261. An action 261B in a corresponding list 261A cause the channel integration manager 261 to provide the information in a format expected by the ATM host/switch 230, such that the ATM host/switch 230 can forward to the financial institution identified by the banking institution identifier and receive and authorization or denial code. Another action 261B in the list 261A causes the channel integration manager 261 to send the authorization or denial code back to the channel integration interface 212 of the ATM 211, and send the code down to an independent dispenser of the ATM 211 (in the case of a withdrawal) for dispensing cash. In this manner, the interfaces to independent peripherals of the ATM 211 and backend systems associated with consummating a financial transaction at the ATM 211 can remain unchanged by the novel channel integration interface 212 and the channel integration manager 261.

An example list 261A of a cash withdrawal transaction may appear as follows:
  action 1—branch based upon channel;
    1.1—online—return error—cash withdrawal not valid online;
    1.2—ATM—validate the users pin block and under daily cash withdrawal limit;
    1.3—teller—validate the teller identity;
  action 2—send message to bank core (core banking system 230) to debit account by amount; and
  action 3—return success to channel application (channel integration interface 212).

The examples illustrate the flexibility of the channel integration manager 261 and the benefits provided by the channel integration manager 261 and the channel integration interfaces (212, 214, 216, 241, and 251), which at least include:
  orchestrating transaction processing as a set of lists 261A with associated actions 261B—business logic that can be reused across channels—servicing Omni-channel transactions;
  allowing lists 261A to branch using actions 261B that can evaluate transaction criteria (including channel-type) list 261A that can be specialized for a particular channel.
  providing actions 261B that allow transactions to be stored and restored from a database, transactions can be started on one channel and completed on another;
  Lowering enterprise costs by reusing business logic across channels;
  providing better service to consumers by providing consistency of processing across channels; and
  providing more flexibility to consumers allowing a transaction to be stored and restored, effectively starting a transaction on one channel and completing it on another.

In an embodiment, at least one local teller terminal 213 is a tablet.

In an embodiment, at least one local teller terminal 213 is a laptop.

In an embodiment, at least one local teller terminal 213 is a smart phone.

In an embodiment, at least one local teller terminal 213 is a wearable processing device.

In an embodiment, at least one local teller terminal 213 is a desktop computer terminal.

In an embodiment, the mobile device 241 can be one of: a tablet, a smart phone, a wearable processing device, and a laptop.

Some of the above-noted aspects of the invention and other aspects are now presented and discussed with reference to the FIGS. 3-6.

Figure 3:
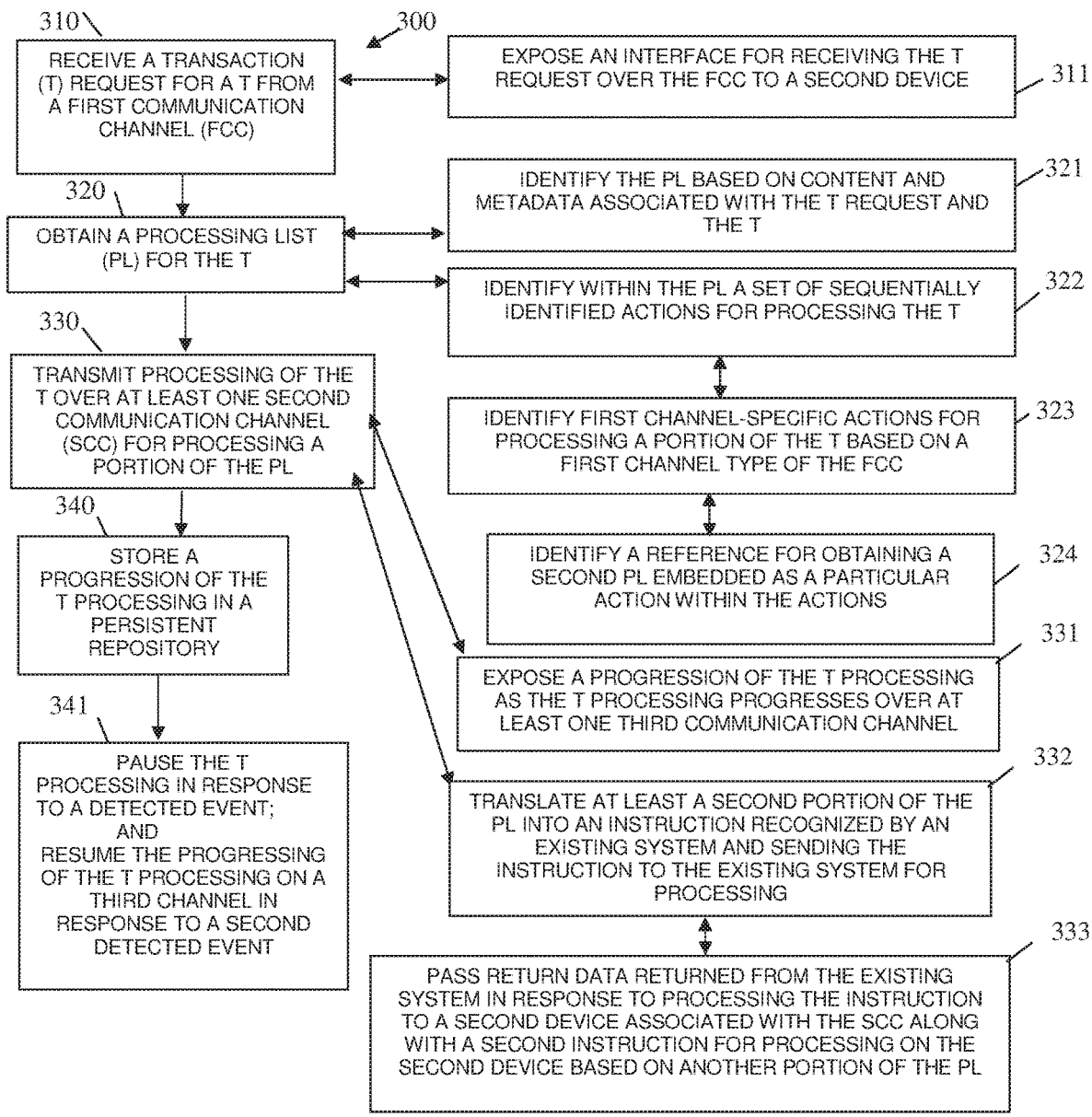
FIG. 3 is a diagram of a method for channel integration processing, according to an example embodiment.

FIG. 3 is a diagram of a method 300 for channel integration processing, according to an example embodiment. The software module(s) that implements the method 300 is referred to as a "channel integration manager." The channel integration manager is implemented as executable instructions programmed and residing within memory and/or a non-transitory computer-readable (processor-readable) storage medium and executed by one or more processors of a device. The processors of the device that executes the channel integration manager are specifically configured and programmed to process the channel integration manager. The channel integration manager has access to one or more networks during its processing. The networks can be wired, wireless, or a combination of wired and wireless.

In an embodiment, the device that executes the channel integration manager is a server.

In an embodiment, the device that executes the channel integration manager is a proxy to an existing backend retail or financial server.

In an embodiment, the device that executes the channel integration manager is a transparent proxy to at least one client device.

In an embodiment, the device that executes the channel integration manager is a forward proxy to at least one client device.

In an embodiment, the channel integration manager reflects processing performed by the channel integration data center 120 of the FIG. 1.

In an embodiment, the channel integration manager is the channel integration manager 261 of the FIG. 2.

At 310, the channel integration manager receives a transaction request for a transaction that originates over a first communication channel.

According to an embodiment, at 311, the channel integration manager an interface for the channel integration manager to receive the transaction request over the first communication channel. The interface is exposed to a second device over the first communication channel. In an embodiment, the interface is exposed as a series of cooperating web pages hosted by and/or managed by the channel integration manager. In an embodiment, the interface is a native interface provided for the channel on which it is servicing. In an embodiment, the interface is any of the interfaces 212, 214, 216, 241, and/or 251 of the FIG. 2. Moreover, aspects of the interface are standardized across all communication channels (e.g., 110A-H) with some aspects customized for the first communication channel (any particular one of the channels 110A-H of the FIG. 1) and the second device (such as formatting or rendering aspects of the interface).

At 320, the channel integration manager obtains a processing list for the transaction. In an embodiment, the manner in which the channel integration manager determines a particular processing list (such as through identifiers for the transaction, channel type of the first communication channel, and content associated with transaction request and transaction) is as described above with reference to the FIG. 2. Moreover, the syntax and semantics (format) of processing lists 261A are as described above with the FIG. 2).

According to an embodiment, at 321, the channel integration manager identifies the processing list based on evaluating and inspecting data content and metadata for the transaction request and the transaction.

In an embodiment, at 322, the channel integration manager identifies within the processing list a set of sequentially identified actions for processing the transaction in a serial order that the actions appear within the processing list.

In an embodiment of 322 and at 323, the channel integration manager identifies within the processing list specific actions for processing a portion of the transaction by identifying those actions as being channel-type specific actions for a channel type that is linked to the first communication channel. Channel-type actions were discussed above with reference to the FIG. 2.

In an embodiment of 323 and at 324, the channel integration manager identifies a reference for obtaining a second-embedded processing list (embedded within the processing list being processed) as a particular type of action. That is, lists 261A can include an action that calls for processing an embedded list and that embedded list includes its own set of sequential actions for processing by the channel integration manager.

It is to be noted that each action in the list is processed by the channel integration manager but any particular action may direct the channel integration manager to perform processing to offload and send portions of that action for processing by a different device over the first communication channel or an entirely different communication channel (this type of processing was discussed above with reference to the FIG. 2).

At 330, the channel integration manager transmits processing of the transaction over at least one second communication channel for processing a portion of the processing list. The channel integration manager is orchestrating transaction processing or controlling the processing flow of the transaction over multiple channels (Omni-channel processing). In an embodiment, the second communication channel is a different and disparate channel type from that which is associated with the first communication channel. In an embodiment, the second communication channel is a same channel type as that which is associated with the first communication channel but is associated with communications from a device that is different from the device communicating over the first communication channel with the channel integration manager. The channel integration manager controls the processing by orchestrating action processing (units of processing or tasks of work) over multiple channels (first and second communication channels) through the logic defined in the processing list (as defined above in the FIG. 2).

According to an embodiment, at 331, the channel integration manager exposes a progression of the transaction processing as the transaction processing progresses over at least one third communication channel (which may be the same as or different and disparate from either the first communication channel and/or the third communication channel).

In an embodiment, at 332, the channel integration manager translates at least a second portion of the processing list into an instruction recognized by an external and existing system (external to the device executing the channel integration manager—existing meaning not modified to specifically communicate with the channel integration manager) and the channel integration manager sends the instruction to the external and existing system. The external and existing system can be any external financial or retail software and network based system (such as, but not limited to, 130, 220, and 230).

In an embodiment of 332 and at 333, the channel integration manager passes return data (can be just a code or a more complex data structure) that is returned from the existing system in response to processing the instruction to a second device (different from the first device that is executing the external financial or retail software-based system). The second device is communicating with the external financial or retail software-based system over the second communication channel (such as through the interface discussed at 311). The channel integration manager passes the return data along with a second instruction for the second device to process on the second device. This is done based on another (third) portion of the processing list (a discrete and serially-defined action that sequentially follows an action that caused the external financial or retail software-based system to send the original instruction to the existing system).

According to an embodiment, at 340, the channel integration manager stores a progression of the transaction (along with all the details associated therewith and along with any enrichment data available uniquely to the channel integration manager—as discussed above with the FIG. 2) in a persistent repository (such as a database or a file accessible to the channel integration manager).

In an embodiment of 340 and at 341, the channel integration manager pauses the transaction processing in response to a detected event (an interface option manually activated over the first or second channel for pausing, an evaluation of a policy condition indicating a pause is necessary, and any condition that would generate an event to pause the transaction as discussed in the FIG. 2). Next, the channel integration manager resumes the progression of the transaction processing on a third channel in response to a second detected event (can be any of the above-mentioned types of events). The resume processing can be delayed from a time that the pause is detected and the length of the delay can be controlled by policy evaluation as to what is a permissible length of delay.

Figure 4:
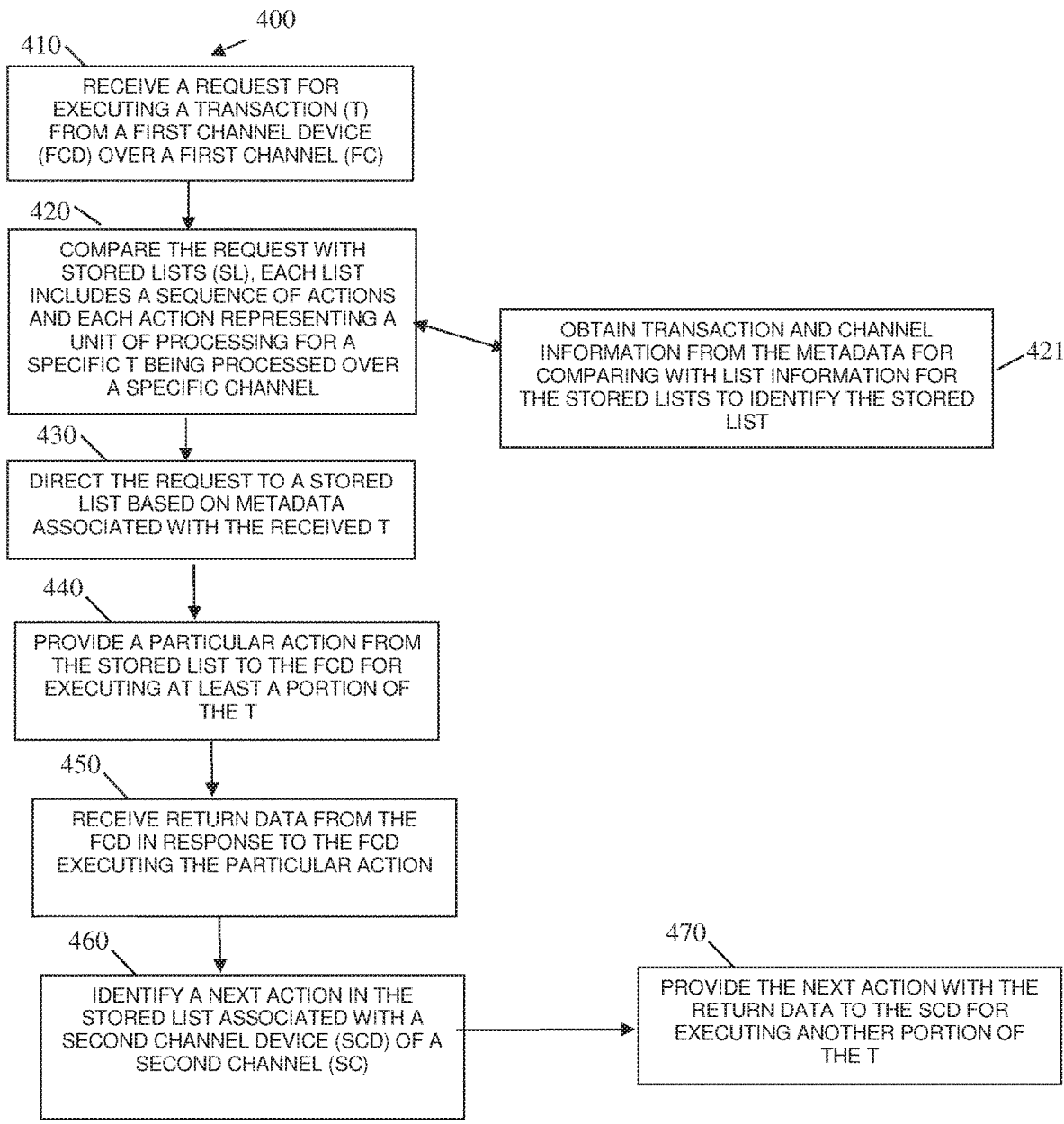
FIG. 4 is a diagram of another method for channel integration processing, according to an example embodiment.

FIG. 4 is a diagram of another method 400 for channel integration processing, according to an example embodiment. The software module(s) that implements the method 400 is referred to as a "channel integration manager." The channel integration manager is implemented as executable instructions programmed and residing within memory and/or a non-transitory computer-readable (processor-readable) storage medium and executed by one or more processors of a device. The processors of the device that executes the channel integration manager are specifically configured and programmed to process the channel integration manager. The channel integration manager has access to one or more networks during its processing. The networks can be wired, wireless, or a combination of wired and wireless.

In an embodiment, the device that executes the channel integration manager is a server.

In an embodiment, the device that executes the channel integration manager is a proxy to an existing backend retail or financial server.

In an embodiment, the device that executes the channel integration manager is a transparent proxy to at least one client device.

In an embodiment, the device that executes the channel integration manager is a forward proxy to at least one client device.

In an embodiment, the channel integration manager reflects processing performed by the channel integration data center 120 of the FIG. 1.

In an embodiment, the channel integration manager is the channel integration manager 261 of the FIG. 2.

The channel integration manager represent another processing perspective of the method 300 of the FIG. 3.

At 410, the channel integration manager receives a request for executing a transaction from a first channel device over a first channel.

At 420, the channel integration manager compares the request with a plurality of stored lists, each list comprising a sequence of actions and each action representing a unit of processing for a specific transaction being processed over a specific channel.

According to an embodiment, at 421, the channel integration manager obtains transaction and channel information from the metadata (discussed below at 430) for comparing with list information for the stored list in order to identify the stored list.

Some example types of transaction and channel information, by way of example only, include: channel identifier, channel type, channel device identifier, channel device type identifier, customer name, customer phone number, customer number, transaction identifier, transaction type, transaction date, transaction details (goods, services, financial transaction data (withdrawal amounts, etc.), and others. Again, in some embodiments, the information may be strictly content based (customer name, data associated with the transaction, etc.) as was discussed above with the FIG. 2.

At 430, the channel integration manager directs the request to a stored list based on metadata associated with the received transaction.

According to an embodiment, at 440, the channel integration manager provides a particular action from the stored list to the first channel device for execution of at least a portion of the transaction.

In an embodiment of 440 and at 450, the channel integration manager receives return data from the first channel device in response to the first channel device executing the particular action.

In an embodiment of 450 and at 460, the channel integration manager identifies a next action in the stored list associated with a second device of a second channel.

In an embodiment of 460 and at 470, the channel integration manager provides the next action with the return data to the second channel device for executing another portion of the transaction.

Figure 5:
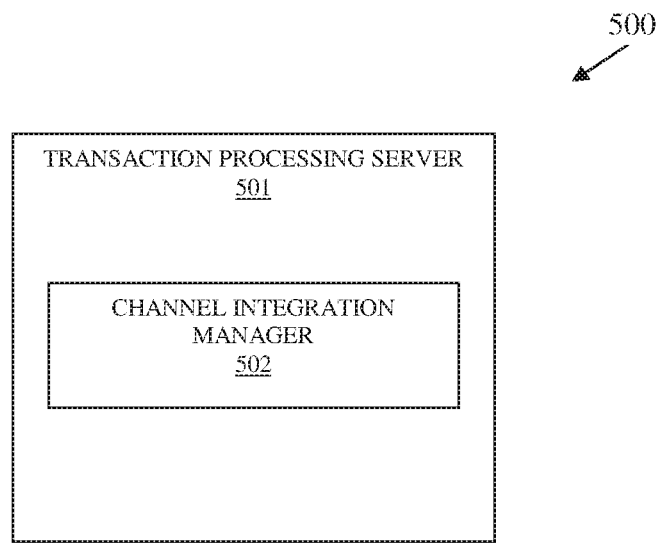
FIG. 5 is a diagram of a transaction processing server, according to an example embodiment.

FIG. 5 is a diagram of a transaction processing server 500, according to an example embodiment. The transaction processing server 500 includes a variety of hardware components and software components. The software components of the transaction processing server 500 are programmed and reside within memory and/or a non-transitory computer-readable medium and execute on one or more processors of the transaction processing server 500. The transaction processing server 500 communicates one or more networks, which can be wired, wireless, or a combination of wired and wireless.

In an embodiment, the transaction processing server 500 is the channel integration data center server 120 of the FIG. 1.

In an embodiment, the transaction processing server 500 is the channel integration server 260 of the FIG. 2.

In an embodiment, the transaction processing server 500 is configured to perform any of the processing discussed above with respect to the methods 300 and 400 of the FIGS. 3 and 4, respectively.

The transaction processing server 500 includes a processor 501 and a channel integration manager 502.

The channel integration manager 502 is adapted and configured to: execute on the processor 501 of the channel integration manager 502, receive a request for executing a transaction from a first channel device over a first channel, locate a list comprising a sequence of actions and each action representing a unit of processing for the transaction, and provide an action from the list to the first channel device for executing a portion of the transaction over the first channel.

In an embodiment, the action is for resuming the transaction when the transaction was previously paused by the second communication channel device over a second communication channel.

In an embodiment, the channel integration manager 502 is further operable to: receive return data from the first channel device in response to the first channel device processing the action, obtain a second action from the list, and provide the second action and the return data over a second channel to process the action as executing of another portion of the transaction.

In an embodiment, the channel integration manager 502 is the channel integration manager 261 of the FIG. 2.

In an embodiment, the channel integration manager 502 is the channel integration data center 120 of the FIG. 1.

In an embodiment, the channel integration manager is the method 300 of the FIG. 3.

In an embodiment, the channel integration manager is the method 400 of the FIG. 4.

In an embodiment, the communication channels is any combination of the communication channels 110A-H of the FIG. 1.

According to an embodiment, the transaction information is for a paused transaction that was previously originated on a different device from the SST and the paused transaction was persisted in a repository by the channel integration manager as the transaction.

Figure 6:
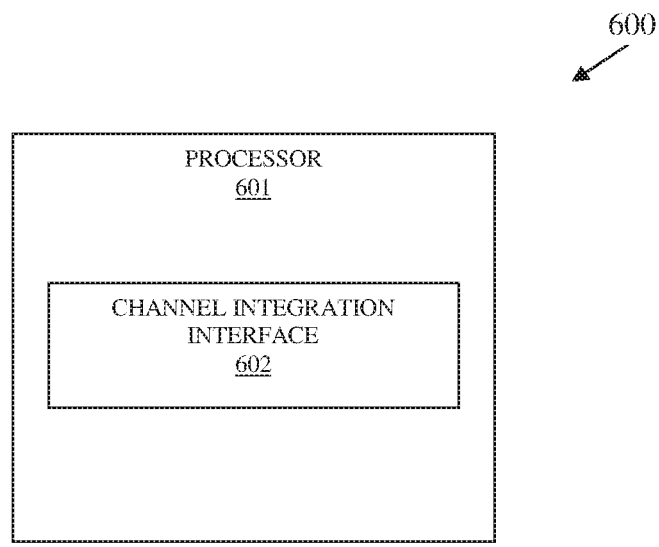
FIG. 6 is a diagram of a SST providing channel integration processing, according to an example embodiment.

FIG. 6 is a diagram of a SST 600 providing channel integration processing, according to an example embodiment. The SST 600 includes a variety of hardware components and software components. The software components of the SST 600 are programmed and reside within memory and/or a non-transitory computer-readable medium and execute on one or more processors of the SST 600. The SST 600 communicates one or more networks, which can be wired, wireless, or a combination of wired and wireless.

In an embodiment, the SST 600 is the ATM 211 of the FIG. 2.

In an embodiment, the SST 600 is a kiosk.

In an embodiment, the SST 600 is a Self-Service Checkout Station.

In an embodiment, the SST 600 is a POS terminal.

The SST 600 includes a processor 601 and a channel integration interface 602.

The channel integration interface 602 is adapted and configured to: execute on the processor 601 of the SST 600, process an interface exposed from a channel integration manager, provide transaction information for the transaction through the interface to the channel integration manager, and process an action received through the interface from the channel integration manager that controls the transaction processing across multiple communication channels.

In an embodiment, the channel integration interface 602 is the interface discussed with the FIG. 1 and exposed by the channel integration data center 120.

In an embodiment, the channel integration interface 602 is the channel integration interface 212 of the ATM 211 of the FIG. 2.

In an embodiment, the channel integration manager is the channel integration data center 120 of the FIG. 1.

In an embodiment, the channel integration manager is the channel integration manager 261 of the FIG. 2.

In an embodiment, the channel integration manager is the method 300 of the FIG. 3.

In an embodiment, the communication channels is any combination of the communication channels 110A-H of the FIG. 1.

According to an embodiment, the transaction information is for a paused transaction that was previously originated on a different device from the SST and the paused transaction was persisted in a repository by the channel integration manager as the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving, by executable instructions that execute on a hardware processor of a server device, a transaction request for processing a transaction from a first communication channel in a first communication channel format through a first communication channel interface associated with one of: an email communication, a web-based communication, an Automated Teller Machine (ATM) communication, a Point-of-Sale (POS) communication, a mobile device communication, a call center communication, a kiosk communication, or a television communication;
   normalizing, by the executable instruction, the transaction request for processing the transaction from the first communication channel format into a normalized channel format;
   tokenizing, by the executable instructions, the transaction request for processing the transaction in the normalized channel format identifying a series of processing actions needed to process the transaction based on a transaction type associated with the transaction and based on channel-specific and backend specific policies associated with at least one second communication channel, and generating a tokenized format for processing the actions of the transaction, wherein each action represents a unit of processing needed to complete a specific portion of the transaction being processed;

obtaining, by the executable instructions, a processing list for the transaction from the tokenized format, the processing list comprising each of the processing actions; and controlling and orchestrating, by the executable instructions, processing of the transaction by providing a portion of the processing list over the at least one second communication channel in a second communication channel format through a second communication channel interface for processing that portion of the processing list by a device associated with the at least one second communication channel that executes that portion, wherein the second communication channel and the second communication channel format are different from the first communication channel and the first communication channel format, and wherein the portion of the processing list includes specific processing actions needed by the device to complete the portion of the transaction, and completing transaction processing for the transaction by the controlling and the orchestrating, and wherein the specific processing actions at least include processing to validate an element of data in the transaction.

2. The method of claim 1 further comprising, storing a progression of the transaction processing in a persistent repository accessible to the server device.

3. The method of claim 2 further comprising:
pausing the transaction processing in response to a detected event; and
resuming the progressing of the transaction processing on a third communication channel in a third format using a third communication channel interface on a second device in response to a second detected event.

4. The method of claim 1, wherein receiving further includes exposing the second communication channel interface for receiving the transaction request over the first communication channel to the second device of the at least one second communication channel.

5. The method of claim 1, wherein obtaining further includes identifying the processing list based on content and metadata associated with the transaction request and the transaction.

6. The method of claim 1, wherein obtaining further includes identifying within the processing list a set of sequentially identified actions for processing the transaction.

7. The method of claim 6, wherein identifying further includes identifying first channel-specific actions for processing a portion of the transaction based on a first channel type of the first communication channel.

8. The method of claim 7, wherein identifying further includes identifying a reference for obtaining a second processing list embedded as a particular action within the actions.

9. The method of claim 1, wherein controlling and orchestrating further includes exposing a progression of the transaction processing as the transaction processing progresses over at least one third communication channel and processed by a second device.

10. The method of claim 1, wherein controlling and orchestrating further includes translating at least a second portion of the processing list into an instruction recognized by an existing system and sending the instruction to a second device of the existing system for processing using an existing system interface of the existing system.

11. The method of claim 10, wherein translating further includes passing return data returned from the existing system in response to processing the instruction to the device associated with the at least one second communication channel along with a second instruction in the second communication channel format through the second communication channel interface for processing on the second device based on another portion of the processing list.

12. A method comprising:
receiving, by executable instructions that execute on a hardware processor from a nontransitory computer-readable storage medium of a server device, a request for executing a transaction from a first device over a first communication channel in a first communication channel format using a first communication channel interface associated with one of: an email communication, a web-based communication, an Automated Teller Machine (ATM) communication, a Point-of-Sale (POS) communication, a mobile device communication, a call center communication, a kiosk communication, or a television communication;

normalizing, by the executable instructions, the request in a normalized format; tokenizing, by the executable instructions, the request in the normalized channel format identifying a series of processing actions based on a transaction type associated with the transaction and based on channel-specific and backend specific policies, wherein the processing actions are needed to process the transaction associated with the request and generating a tokenized format for the request;

comparing, by the executable instructions, the request in the tokenized format with a plurality of stored lists, each list comprising a sequence of actions and each action representing a unit of processing that is needed to be completed for a specific portion of the transaction being processed over a specific communication channel; and directing and orchestrating, by the executable instructions, the request to a particular stored list from the plurality of stored lists based on metadata associated with the received transaction and the comparing using the tokenized format, and wherein directing and orchestrating further includes providing the unit of processing associated with the actions for the particular stored list to specific devices associated with the specific communication channels as identified in the particular stored list in specific communication channel formats and using specific communication channel interfaces for execution of the actions by the specific devices, wherein at least one of the specific communication channel formats is different from the first communication channel format, and completing transaction processing to satisfy the transaction associated with the request by the directing and orchestrating, and wherein the actions at least include processing to validate an element of data in the transaction.

13. The method of claim 12 further comprising, providing a particular action from the particular stored list to the first device for execution of a least a portion of the transaction.

14. The method of claim 13 further comprising, receiving return data as output from the first device in response to the first device executing the particular action.

15. The method of claim 14 further comprising, identifying a next action in the particular stored list associated with a second device of a second communication channel.

16. The method of claim 15 further comprising, providing the next action with the return data to the second device in a second communication channel format using a second communication channel interface for executing another portion of the transaction by the second device.

17. The method of claim 12, wherein comparing further includes obtaining transaction and communication channel information from the metadata for comparing with list information for the stored lists to identify the particular stored list.

18. A transaction processing server, comprising:
- a non-transitory computer-readable storage medium including executable instructions;
- a hardware processor; and
- the executable instructions configured to execute on the hardware processor from the non-transitory computer-readable storage medium and perform processing to:
- receive a request for executing a transaction from a first device over a first communication channel in a first communication channel format using a first communication channel interface associated with one of: an email communication, a web-based communication, an Automated Teller Machine (ATM) communication, a Point-of-Sale (POS) communication, a mobile device communication, a call center communication, a kiosk communication, or a television communication;
- normalize the request from the first communication channel format to a normalized format;
- tokenize the request in the normalized channel format to identify a series of processing actions based on a transaction type associated with the transaction and based on channel-specific and backend specific policies, wherein the actions are needed to process the transaction associated with the request and generate a tokenized format for the request;
- locate a list comprising a sequence of actions and each action representing a unit of processing for completing a portion of the transaction based on the tokenized format for the request;
- provide a particular action from the list to the first device in the first communication channel format using the first communication channel interface for executing a portion of the transaction over the first communication channel by the first device; and
- route other actions from the list to one or more different devices in different communication channel formats using different communication channel interfaces for executing remaining portions of the transaction to satisfy the request and transaction processing for the transaction, and wherein the other actions at least include processing to validate an element of data in the transaction.

19. The transaction processing server of claim 18, wherein the particular action is directed to resuming the transaction when the transaction was previously paused by a second device over a second communication channel using a second communication channel format and a second communication channel interface.

20. The transaction processing server of claim 18, wherein the executable instructions are further configured to perform processing to:
- receive return data from the first device in response to the first device processing the particular action;
- obtain a second action from the list; and
- provide the second action and the return data to a second device over a second communication channel in a second communication channel format using a second communication channel interface to execute the second action as execution of another portion of the transaction by the second device.

* * * * *